L. P. HALLADAY.
AUTOMOBILE BUMPER.
APPLICATION FILED SEPT. 24, 1917.
1,314,800.
Patented Sept. 2, 1919.
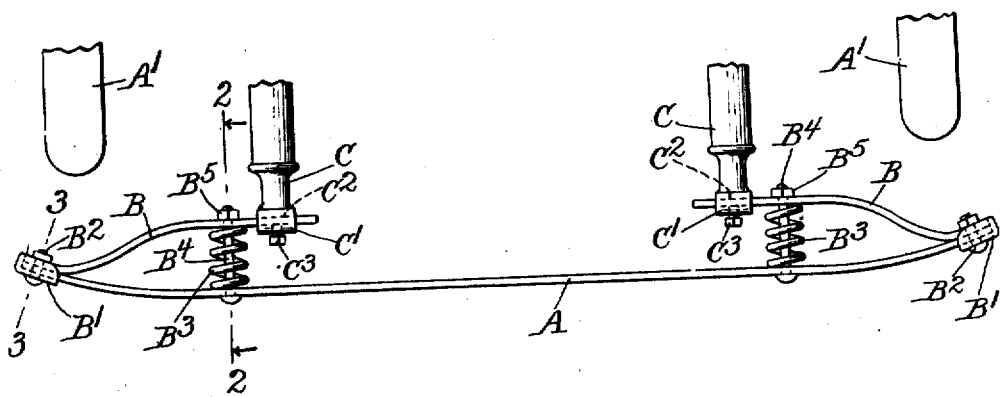
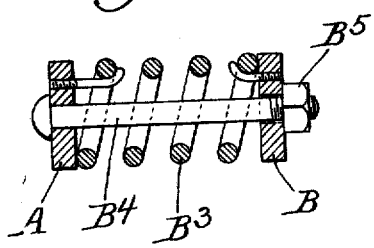
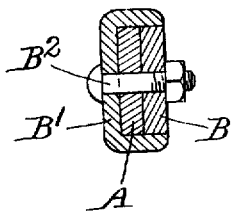
Witness.
Edward T. Wray.
Inventor.
Lewis P. Halladay.
by Parker & Carter
Attorneys.

UNITED STATES PATENT OFFICE.

LEWIS P. HALLADAY, OF STREATOR, ILLINOIS.

AUTOMOBILE-BUMPER.

1,314,800.  Specification of Letters Patent.  Patented Sept. 2, 1919.

Application filed September 24, 1917. Serial No. 192,862.

*To all whom it may concern:*

Be it known that I, LEWIS P. HALLADAY, a citizen of the United States, residing at Streator, in the county of La Salle and State of Illinois, have invented a certain new and useful Improvement in Automobile-Bumpers, of which the following is a specification.

My invention relates to improvements in automobile bumpers and has for one object to provide a new and improved form of yielding, flexible or elastic bumper which may be easily and conveniently mounted on the front or rear end of the motor vehicle which will thereby be protected against contact with other bodies. Another object is provide a form of bumper which will be simple and convenient, cheap to manufacture and install, easy to clean, durable and easy to renew. Other objects will appear from time to time throughout the specification.

My invention is illustrated more or less diagrammatically in the accompanying drawings wherein Figure 1 is a plan view;

Fig. 2 is a section on the line 2—2 of Fig. 1;

Fig. 3 is a section on the line 3—3 of Fig. 1;

Like parts are indicated by like characters in all the figures.

I have shown a motor bumper but have not illustrated it in connection with a motor vehicle because clearly it might be attached to the front end of the frame, the springs, or the rear end of the frame or the rear end of the springs of any motor vehicle and the vehicle itself forms no part of my invention.

A is an elongated spring bar extending across the front or rear of the vehicle so arranged that its ends overhang the sides of the vehicle and project beyond the vehicle wheels $A^1 A^1$. This bar forms what is in effect a semi-elliptic spring. Projecting inwardly from each end of this semi-elliptic spring are what I prefer to call quarter-elliptic spring members B B. These members just at their ends are bent rearwardly to conform to the rearward curvature of the end of the bar A and penetrate a socket $B^1$ which holds the two parallel adjacent ends of the semi-elliptic and the quarter-elliptic springs together. $B^2$ is a rivet passing through the springs and through the walls of the socket to lock the parts together and hold them in proper relation. $B^3$ is a spiral coil spring interposed between the rear side of the semi-elliptic spring A and the front side of each of the quarter-elliptic springs B somewhere adjacent the inner free ends of the quarter-elliptic springs. This spiral spring is held under compression by means of a bolt $B^4$ and nut $B^5$ the parts being so arranged that the coil spring is positioned between the flat springs by the bolt and exerts a pressure tending to separate the flat springs and exerts a tension on the bolt. The bolt passes through the two flat springs and is free to move longitudinally with respect to them. Thus the bumper forms a unit made up of a single flat semi-elliptic spring, two flat quarter-elliptic springs joined at their outside ends to the ends of the semi-elliptic spring and two coil springs interposed between the semi-elliptic and the inner ends of the quarter-elliptic springs.

C C are brackets projecting outwardly from the usual vehicle spring end or frame as the case may be. They terminate in holding heads $C^1$ adapted to engage and support the inner free ends of the quarter-elliptic springs which preferably are thrust in slots $C^2$ in the holding head $C^1$ held in position by set screws $C^3$.

It will be evident that while I have shown an operative device still many changes might be made both in size, shape and arrangement of parts without departing materially from the spirit of my invention and I wish, therefore, that my drawings be regarded as in a sense diagrammatic.

The use and operation of my invention are as follows:

The operator will start ordinarily with the spring portion of the bumper assembled as a unit although obviously the parts might come in knocked down condition in which case he would first engage the free ends of the semi-elliptic and the outer ends of the quarter-elliptic springs in the sockets provided and bolt them in position and then place the coil spring in position between the two flat springs, pass the bolt through the flat springs and through the coil spring, tighten up the nuts to give the initial compression to the coil spring. The operator would then pass the free ends of the flat quarter-elliptic spring through the slots in the bracket heads. He then fastens the brackets in position on the vehicle body in the usual manner moving the brackets with respect to the quarter-elliptic springs toward one another or away from one another as the case may be depending upon the width of the vehicle. This being done and the brackets clamped in position on the vehicle the operator tightens the set screws to lock the free ends of the quarter-elliptic springs in position in the slotted heads. The bumper is then ready for operation.

If any object strikes the bumper, the bumper gives, the spring bar will yield directly to the rear, compressing the coil springs and flexing the ends of the quarter-elliptic and half elliptic spring. The spring holding bolt will then be longer than the distance between the outside of the flat springs and will slide loosely through the perforations in the two flat springs. This, of course, will do no harm whatever. If it should happen that the blow came from the side, the quarter-elliptic and the half-elliptic spring would be free to give or bend or buckle as the case may be and if the blow came from the right hand side possibly the quarter-elliptic spring on that side might be bent forward and the quarter-elliptic spring on the left be bent backward and the ends of the half-elliptic spring might be bent around so as to make the spring more curved.

In other words, any number of responses might be made by the semi-elliptic and the quarter-elliptic springs to a blow or impact depending on the side from which it came.

I claim:—

1. A bumper for motor vehicles and the like comprising a single flat semi-elliptic spring extending transversely across the front of the vehicle and yielding means for supporting it thereupon comprising two quarter-elliptic springs, brackets separate from them upon which the inner ends thereof are supported on the vehicle the outer ends thereof engaging and supporting the free ends of the semi-elliptic spring.

2. A bumper for motor vehicles and the like comprising a single flat semi-elliptic spring extending transversely across the front of the vehicle, two flat quarter-elliptic springs having their outer ends rigidly connected to the ends of the semi-elliptic spring, brackets projecting from the motor vehicle and separate from the bumper the free ends of the quarter-elliptic springs being in adjustable engagement with the ends of the brackets.

3. A bumper for motor vehicles and the like comprising a single flat semi-elliptic spring extending transversely across the front of the vehicle, two flat quarter-elliptic springs having their outer ends rigidly connected to the ends of the semi-elliptic spring, brackets projecting from the motor vehicle the free ends of the quarter-elliptic spring being in adjustable engagement with the ends of the brackets yielding means interposed between the semi-elliptic spring and each of the quarter-elliptic springs adjacent said brackets.

4. A bumper for motor vehicles and the like comprising a single flat semi-elliptic spring extending transversely across the front of the vehicle, two flat quarter-elliptic springs having their outer ends rigidly connected to the ends of the semi-elliptic spring, brackets projecting from the motor vehicles the free ends of the quarter-elliptic spring being in adjustable engagement with the ends of the brackets yielding means interposed between the semi-elliptic spring and each of the quarter-elliptic springs adjacent said brackets said means comprising an adjustable bolt passing through both flat springs and a coil spring mounted on the adjustable bolt held by it in engagement with both flat springs.

5. A bumper for motor vehicles and the like comprising a single flat semi-elliptic spring extending transversely across the front of the vehicle, brackets projecting from the vehicle intermediate the ends of the semi-elliptic spring, flat quarter-elliptic springs projecting outwardly from said brackets, sockets at the ends of the semi-elliptic spring engaged by the quarter-elliptic springs and rigidly attached thereupon, coil springs interposed between the quarter and semi-elliptic springs adjacent said brackets and a bolt passing through each of the coil springs and the two associated flat springs free to move longitudinally with respect to all of them.

6. A bumper for motor vehicles and the like comprising a single flat semi-elliptic spring, extending transversely across the front of the vehicle, quarter-elliptic springs connecting the ends of said spring to the vehicle, and spiral springs interposed between the semi-elliptical springs and the quarter-elliptical springs.

7. A bumper for motor vehicles and the like comprising a single flat semi-elliptic spring, extending transversely across the front of the vehicle, quarter-elliptic springs connecting the ends of said spring to the vehicle, and spiral springs interposed between the semi-elliptical springs and the quarter-elliptical springs adjacent the ends of the semi-elliptical springs.

8. A bumper for motor vehicles and the like comprising a single flat semi-elliptic spring, extending transversely across the front of the vehicle, quarter-elliptic springs connecting the ends of said spring to the vehicle, said connection being adjustable, and spiral springs interposed between the semi-elliptical springs and the quarter-elliptical springs.

9. A bumper for motor vehicles and the like comprising a single flat semi-elliptic spring, extending transversely across the front of the vehicle, quarter-elliptic springs connecting the ends of said spring to the vehicle, said connection being adjustable, and spiral springs interposed between the semi-elliptical springs and the quarter-elliptical springs adjacent the ends of the semi-elliptical springs.

10. A bumper for motor vehicles and the like comprising a single flat semi-elliptic spring extending transversely across the front of the vehicle and yielding means for supporting it thereupon comprising two quarter-elliptic springs, brackets upon which the inner ends thereof are supported on the vehicle the outer ends thereof engaging and supporting the free ends of the semi-elliptic spring, the inner ends of the quarter-elliptical springs being out of contact or connection with the semi-elliptical spring.

In testimony whereof, I affix my signature in the presence of two witnesses this 30th day of August 1917.

LEWIS P. HALLADAY.

Witnesses:
I. GOEBEL,
W. J. HEINEKE.

Copies of this patent may be obtained for five cents each, by addressing the "Commissioner of Patents, Washington, D. C."